Sept. 20, 1932.    R. T. HYMER ET AL    1,878,854
VEHICLE BRAKE MECHANISM
Filed Oct. 30, 1928
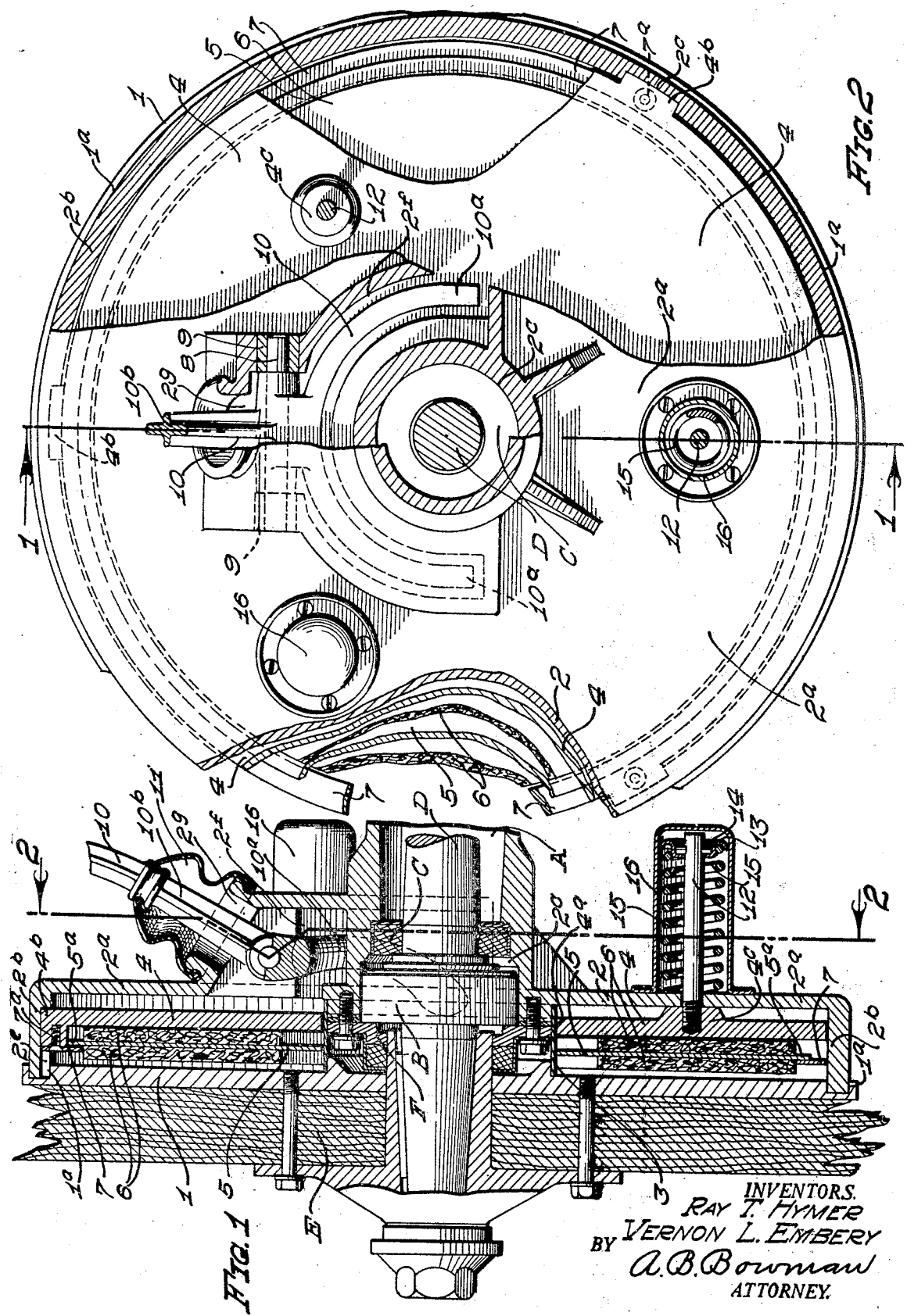
INVENTORS.
RAY T. HYMER
BY VERNON L. EMBERY
A.B.Bowman
ATTORNEY.

Patented Sept. 20, 1932

1,878,854

UNITED STATES PATENT OFFICE

RAY T. HYMER, AND VERNON L. EMBERY, OF SAN DIEGO, CALIFORNIA

VEHICLE BRAKE MECHANISM

Application filed October 30, 1928. Serial No. 315,938.

Our invention relates to vehicle brake mechanisms and the objects of our invention are: First, to provide a brake mechanism having a large friction surface thereby reducing the wear thereof while at the same time providing sufficient and dependable braking action; Second, to provide a device of this class in which deleterious matter is prevented from coming in contact with the friction surfaces of the brake mechanism thereby greatly increasing the life thereof by reducing the wear caused by gritty particles; Third, to provide a device in which, when the brake is in its released position, the friction surfaces are entirely free from the revolving side of the mechanism, thereby practically eliminating useless wear and consequently prolonging the life of the friction surfaces; Fourth, to provide a device of this class which needs, although the friction surfaces are free from the revolving side of the mechanism, only a minimum amount of movement in order to bring the friction surfaces in contact with the revolving portions; Fifth, to provide a device of this class in which almost all wear due to friction when the brake is in released position and due to the action of deleterious matter is eliminated, whereby the friction surfaces need only slight attention and last for a long period of time; Sixth, to provide a device of this class in which the friction surfaces may be easily removed or replaced by one who has little or no mechanical training; Seventh, to provide a device of this class which does not necessitate a radical change in the construction of the conventional wheels, axles and axle housings; Eighth, to provide a device of this class which is especially adaptable to the vehicle wheel brake and which may be operated with but slight change in the conventional brake actuating mechanism; and Ninth, to provide a device of this class which is sturdy of construction, durable, efficient in its action, relatively simple of construction proportional to its functions, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of our brake mechanism along the line 1—1 of Fig. 2 with parts and portions shown in elevation to facilitate the illustration and with the brake actuating lever and the adjacent portions of a vehicle wheel, axle and axle housing shown fragmentarily; and Fig. 2 is a transverse sectional view thereof through 2—2 of Fig. 1 with parts and portions shown in elevation to facilitate the illustration.

Similar characters of reference refer to similar parts and portions throughout the several views of the drawing.

Secured brake plate 1, brake housing 2, sleeve member 3, sliding brake plate 4, friction disc support 5, friction discs 6, retaining ring 7, lever pin 8, lever bearing 9, actuating lever 10, lever boot 11, brake release rods 12, cup members 13, pins 14, brake release springs 15, and cap members 16, constitute the principal parts and portions of our brake mechanism.

The brake mechanism is enclosed by a secured brake plate 1, bolted in this case to a wheel of a vehicle, and a brake housing 2 which may be secured or made integral with a vehicle axle housing A.

The secured brake plate is in the form of a circular, flat disc having an annular recessed portion 1a around the inner side thereof adjacent to the periphery, as shown best in Fig. 1. The brake housing is provided with a circular, flat portion 2a forming the inner side of the brake mechanism, and an annular wall 2b connected with the plate portion 2a of the housing and enclosing the peripheral portions of the brake mechanism.

The extended end of the wall 2b is adapted to fit in the recessed portion 1a of the secured brake plate 1 in such a manner that the brake plate 1 may revolve relative to the brake housing yet form a joint therewith which prevents dirt or deleterious matter from entering.

The central portion of the brake housing joins the axle housing A and becomes a continuation thereof forming a bearing housing 2c. Mounted within the bearing housing portion 2c and upon an axle D is a conventional bearing B and a grease retaining washer C. The axle D extends through the bearing B and is secured by conventional means to the wheel E, a suitable bearing retaining ring and grease retaining means F being provided between the bearing and the wheel.

Supported between the flat portion 2a of the brake housing and the secured brake plate 1 around an annular ridge 1b thereof and around the bearing housing portion 2c is an annular sleeve member 3. This sleeve may be made part of the housing 2, if desired.

Mounted upon the sleeve 3 by means of an annular opening 4a therein is a flat sliding brake plate 4 which extends to the internal periphery of the wall 2b. This plate is adapted to slide axially relative to the brake housing. It is prevented from revolving relative to the brake housing by means of keyways 2e formed in spaced relation in the internal sides of the wall 2b into which extend lug portions 4b of the sliding brake plate 4. Loosely mounted so as to slide axially upon the sleeve 3 is a flat friction disc support 5.

Secured to each side of the friction disc support 5 by any suitable means is a friction disc 6. The outer periphery 5a of the disc support 5 extends past the friction discs. The lugs 4b extending from the sliding brake plate into the keyways 2e also extend axially over the disc support and secure by screws 7a a retaining ring 7 which overlaps the peripheral portion of the friction disc support 5, as shown in Fig. 1. This arrangement permits the friction disc support and friction discs to move with the sliding brake plate yet revolve relative thereto.

Thus it will be noted that the friction discs 6, together with their support 5, are free and float and hence when pressed between the disc 4 and the wheel plate 1 assume a rotation depending upon the intensity of the braking application.

Part of the flat portion 2a forming the inner side of the brake housing is extended axially inwardly forming a casing portion 2f. Mounted in the casing portion 2f on a pin 8 which extends into bearings 9 formed therein, is a brake actuating lever 10 consisting of a bifurcated portion 10a which straddles the bearing housing portion. The ends of the bifurcated portion 10a are adapted to engage the central portion of the sliding brake plate 4.

The other arm 10b of the brake lever extends outwardly through an opening 2g in the brake housing large enough to permit shifting of the lever. A flexible boot member 11 is secured by any suitable means between the opening 2g and the extending portion 10b of the lever 10, thereby permitting movement of the lever at the same time sealing the opening and preventing dirt or other deleterious matter from entering the brake housing.

Bosses 4c are provided in spaced relation on the inner side of the sliding plate 4 for receiving brake releasing rods 12. The bosses 4c also serve as a stop means for limiting the inward or releasing movement of the plate 4 by engaging the housing 2. The rods 12 are provided with spring retaining cups 13 held in position by pins 14. Brake releasing springs 15 extend between the retaining cups 13 and the inner side of the housing 2, as shown best in Fig. 1. A suitable cap 16 encloses the springs and rods.

The springs 15 tend to hold the sliding brake plate 4 against the housing 2 and away from the secured brake plate 1, as shown best in Fig. 1. Thus the springs return the sliding brake plate to a released position when the lever 10 is released. When the sliding brake plate 4 is in this position the friction discs are entirely free from the secured brake plate, thereby permitting the secured brake plate and wheel to revolve freely. Movement of the lever 10 against the action of the springs causes the outer friction disc 6 to come in contact with the secured brake plate, which is revolving when the vehicle is in motion. Continued movement of the lever 10 brings the sliding brake plate 4 firmly against the other friction disc exerting pressure thereon and as the friction discs have a high coefficient of friction a great deal of braking force is applied to the wheel.

It can be seen from Fig. 1 that the discs 6 tend to revolve at a speed approximately half the speed of rotation of the secured brake plate as a result of the two forces in opposite direction of rotation, thereby the discs revolve relative to both the brake plates. In so doing there is a friction surface between both friction discs and both plates giving a maximum braking surface in a minimum amount of space.

It is obvious that a braking surface in the form of a disc is easy to maintain contact over the whole surface, thereby preventing uneven wear.

It can also be seen from the structure that in order to renew the friction discs it is only necessary to remove the wheel E and the retaining ring 7, whereupon new friction discs with a new disc support if desired, may be inserted.

Although in the drawing the brake mechanism is shown in connection with a rear or drive wheel of a vehicle, it is obvious that the brake housing may be secured or made integral with a portion of the spindle of the front or guide wheels of a vehicle.

Furthermore, it can be seen that this brake mechanism is adaptable wherever there is revolving mechanism.

It is obvious from the construction as illustrated in the drawing and described in the foregoing specification that there is provided a brake mechanism as aimed at and set forth in the objects of the invention, and though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by letters patent is:

1. In a brake mechanism, a plate member revoluble with a vehicle wheel, a housing locked against rotation adapted to form with said plate member a shield against deleterious matter, a second plate slidably mounted within said housing, and a pair of floating friction discs mounted between said plates.

2. In a brake mechanism, a plate member revoluble with a vehicle wheel, a housing locked against rotation, a second plate slidably mounted within said housing, a floating third plate slidably mounted in said housing, friction discs secured to the opposite sides of said third plate and slidable therewith, and actuating means extending from said housing for shifting said second plate axially and clamping said friction discs between said first and second plates, and spring means for releasing said plates.

3. In a brake mechanism, a plate member secured to a revoluble means, a housing locked against rotation, a second plate slidably mounted within said housing, a floating third plate slidably mounted in said housing, friction discs secured to the opposite sides of said third plate and slidable therewith, actuating means extending from said housing for shifting said second plate axially and clamping said friction discs between said first and second plates, and spring means for releasing said plates, said housing and said first plate member adapted to form a seal against deleterious matter.

4. In a brake mechanism, a plate member secured to a revoluble means, a housing locked against rotation, a second plate slidably mounted within said housing, a floating third plate slidably mounted in said housing, friction discs secured to opposite sides of said second plate and slidable therewith, actuating means extending from said housing for shifting said second plate axially and clamping said friction discs between said first and second plates, and other means for releasing said plates, said housing and said first plate member adapted to form a shield against deleterious matter, said actuating means and said housing adapted to form therebetween a seal against deleterious matter.

In testimony whereof, we have hereunto set our hands at San Diego this 20th day of October, 1928.

RAY T. HYMER.
VERNON L. EMBERY.